Nov. 26, 1957 R. D. MADDOX 2,814,666
ELECTRICAL CABLE
Filed April 8, 1953 3 Sheets-Sheet 1

Inventor
Richard D. Maddox
By Doane Glaister Anderson
Attorneys

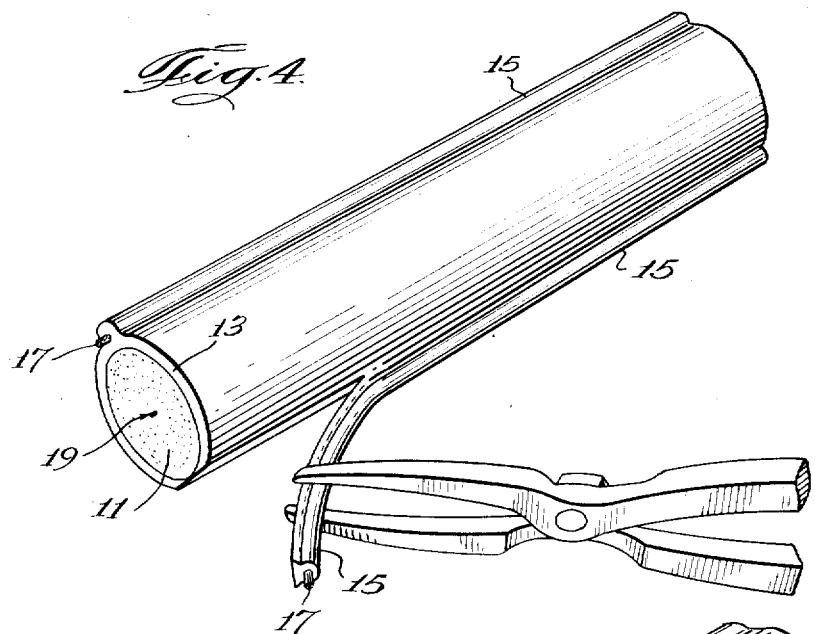
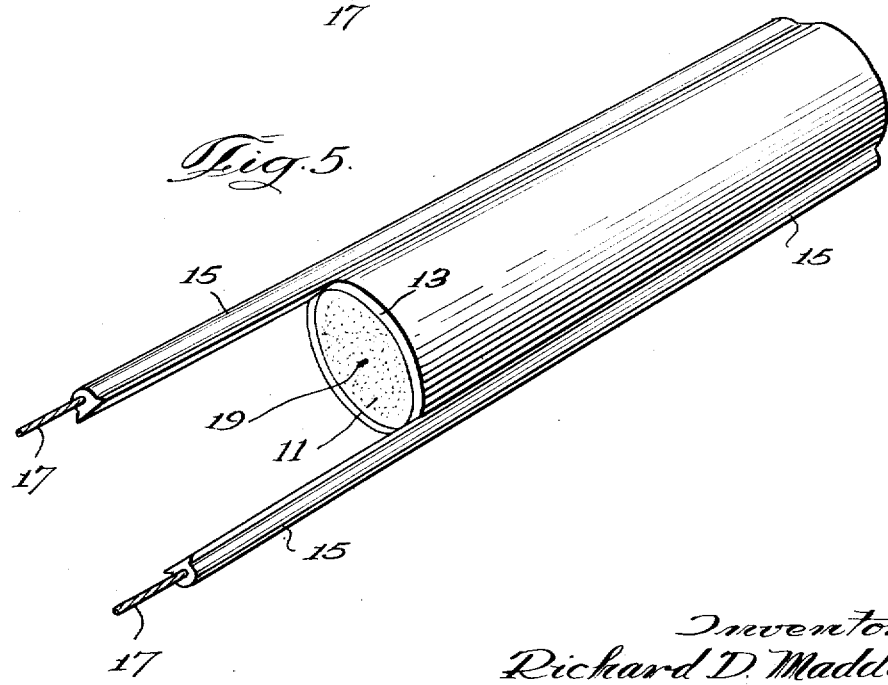

Nov. 26, 1957 — R. D. MADDOX — 2,814,666
ELECTRICAL CABLE
Filed April 8, 1953 — 3 Sheets-Sheet 3

Inventor
Richard D. Maddox
By Soans, Glaister & Anderson
Attorneys

United States Patent Office 2,814,666
Patented Nov. 26, 1957

2,814,666

ELECTRICAL CABLE

Richard D. Maddox, Richmond, Ind., assignor to Belden Manufacturing Company, Chicago, Ill., a corporation of Illinois Application April 8, 1953, Serial No. 347,428

3 Claims. (Cl. 174—113)

The present invention relates to electrical cables, and has particular relation to duplex and other multiple conductor cables suitable for high frequency energy transmission, and especially for television lead-in service.

Multiple conductor cables for television lead-in service and similar high frequency uses must satisfy a number of quite exacting, electrical, mechanical and economic requirements, some of which are conflicting in nature. To conform to the accepted practices of the industry, it is important that such cables shall present a predetermined impedance to the load, which impedance is in accordance with the design standards of the equipment with which the cable is to be used.

In addition, to maintain good electrical efficiency in the associated apparatus, the impedance of the cable should remain substantially constant throughout the useful life of the cable, independently of the surrounding conditions, or of change in those conditions. The attaining and the maintaining of this impedance value usually requires that the internal capacitance of the cable shall be as low as possible, and that during use, this capacitance shall change as little as possible.

It is also necessary that satisfactory cables for television and similar high frequency use shall be capable of being installed without unreasonable difficulty. Moreover, since such cables are frequently located on the outside of buildings and on other outdoor structures, it is important that the cable shall be capable of being installed without unreasonable disfigurement of the building.

In instances where the cable passes alongside of metal objects, such as flashing or guttering, it is usually considered advisable to transpose the conductors by twisting the cable in order to maintain uniform electrical characteristics. This requires that the cable shall not be too rigid or too resistant to twisting. It is also important, in order that the cable shall have the longest possible useful life, and in order that it will maintain its electrical characteristics, that the cable shall be sufficiently resistant to crushing to permit its being clamped securely.

During installation, it is almost always necessary to separate the individual cable conductors at either or both ends of the cable in order to complete the electrical connections. Thus, it is desirable that the cable structure shall be of a readily divisible type to permit this separation to be accomplished with a minimum expenditure of installation time and effort.

In addition to the electrical and mechanical requirements in the cable set forth above, it is of very great importance that the cost of the cable shall be within reasonable limits. It is frequently necessary to use rather long lengths of transmission cable, and unless the cost of the cable is within reason, it cannot be sold, regardless of how well it meets the other requirements.

Various cable arrangements have been suggested in the past for television lead-in and similar high frequency purposes, but none has proven completely satisfactory. For example, one type which is in quite wide-spread use has a cross-sectional outline which is somewhat similar to the cross-sectional outline of a dumbbell. While this cable, when new, gives quite satisfactory results, its electrical characteristics deteriorate rapidly when the cable becomes wet or when its surface becomes dirty.

In another type, the conductors are spaced on opposite diameters of a generally hollow, tubularly-shaped insulating body. When new, this cable has good electrical characteristics, but unless it is sealed at both ends—a time consuming and somewhat troublesome operation—condensation and dirt collect within the cable insulation and the electrical characteristics of the cable are markedly impaired with the passage of time.

Moreover, even when this type cable is sealed at both ends, the inherent inability of the cable structure to resist crushing and kinking frequently causes cracks or other openings to develop in the cable walls. Through these openings, moisture and dirt are admitted to the interior of the cable, despite the presence of the end seals, and deterioration of the electrical properties follows.

Further, this tubular cable is very difficult to install. To provide a cable which is reasonably self supporting, it is necessary to use walls of such thickness that the cable is inherently quite stiff. In addition, due possibly to the lack of internal support within the cable, the cable has a tendency to kink, and it cannot be properly clamped in position without collapsing the cable walls, especially in cold weather. It is also very difficult to effect transposition of the cable without kinking or collapsing the tubular insulation. Duplex, tubular cable of this type, as produced, is of the divisible type, although the separation of the individual conductors requires a little care and experience.

The principal object of the present invention is to provide an improved, low-loss, low-capacitance cable suitable for high frequency and other use, which shall be free of the above-noted objections, and especially to provide an improved, divisible, tubular conductor, high frequency cable for use as a television lead-in or the like.

As will hereinafter appear, this object of the invention is accomplished by the provision of a cable of novel design and construction. The invention also includes the concept of a novel cable manufacturing procedure which makes possible the production of the novel cable constructions of the invention at high speed and at relatively low cost.

In the drawings:

Figure 4 is a perspective view illustrating the manner in which the two individual leads and the insulation surrounding those leads can be separated from the remaining portions of a cable of the general type illustrated in Figures 2 and 3;

Figure 5 is a perspective view illustrating the cable when ready for use; and

Figure 2:
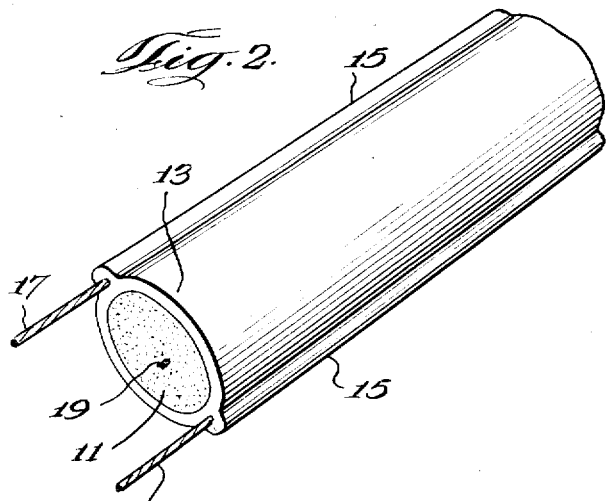
Figure 2 is an enlarged, perspective view of a cable of the type which can be manufactured by the use of the equipment and procedure illustrated diagrammatically in Figure 1.
Figure 3:
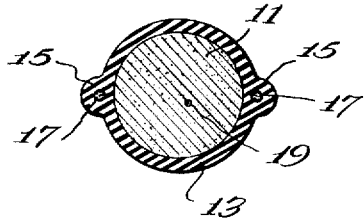
Figure 3 is a sectional view of the cable illustrated in Figure 2.

As previously stated, the improved high frequency cable of the present invention is particularly adapted for use as a television lead-in and for similar purposes, and the embodiment of the invention illustrated in Figures 2 and 3 of the drawings is a duplex cable, especially designed for this service. Cables in accordance with the invention and the manufacturing procedures herein disclosed are, however, suitable for other uses, and may take forms other than that shown in the drawings.

The particular embodiment of the invention illustrated in Figures 2 and 3 comprises generally a core 11 which is of circular cross section, and an external sheath or jacket 13 disposed about and in intimate contact with the core, the sheath 13 including thickened sections 15 positioned at opposite sides thereof, so as to provide a secondary sheath of insulating material, integral with the remainder of the cable, enclosing each of the two cable conductors 17. The core is made of a multi-cellular or foam-type insulating material, the objective being the provision of a core body of sufficient strength to withstand crushing and to resist kinking, while at the same time, providing a reasonably flexible cable having an interior section which consists of a series of individually sealed, unconnected, cells containing air or gas.

Expanded cellular or foam polyethylene is a particularly satisfactory material for this purpose, especially in the manufacture of cables for television lead-in and similar high frequency purposes. This material, when expanded to the extent hereinafter specified, provides a core of satisfactory mechanical characteristics, and of particularly satisfactory electrical characteristics, the dielectric constant of the material being approximately 1.5. Additionally, this material can be bonded very tightly to an external sheath of normal polyethylene, thereby providing a cable which does not need to be sealed at the ends during use, but which has electrical characteristics equivalent or superior to a hollow core cable. The external sheath can be made quite thin, this also contributing to the attaining of desirable mechanical properties in the finished cable.

Figure 1:
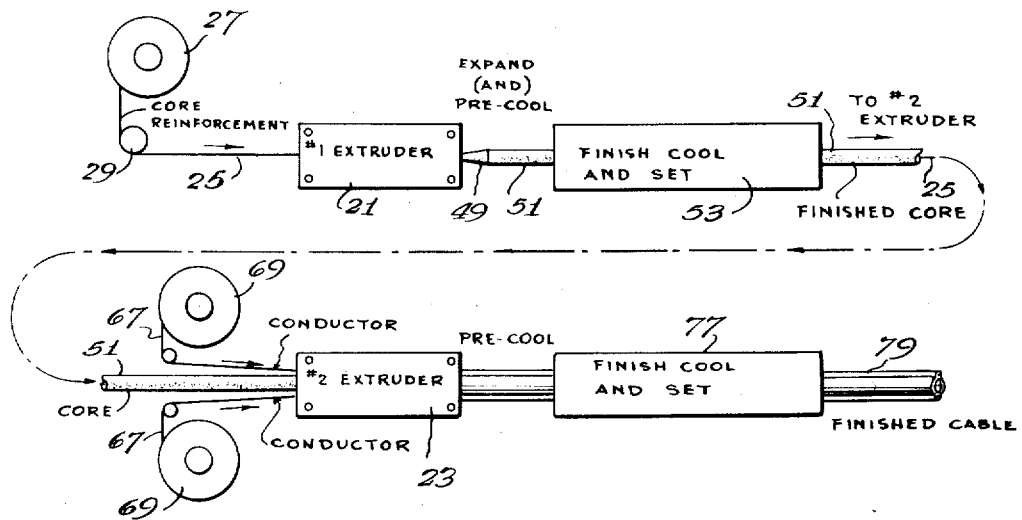
Figure 1 is a diagrammatic view illustrating the manufacture of a duplex conductor cable in accordance with the invention.

Cables of the type shown in Figures 2 and 3 are most satisfactorily manufactured by a multiple extrusion operation, and a particularly suitable procedure for this purpose is illustrated in the diagrammatic view of Figure 1. In connection with this manufacturing operation, it is important to note that multi-cellular materials such as foam polyethylene require very careful handling during extrusion, and apparently it is not practical, or at least, it is extremely difficult to manufacture cores of this material by an extrusion operation unless a thread or equivalent filamentary reinforcement is run through the extruder during the extrusion operation. Such a thread reinforcement is indicated at 19 in Figures 2 and 3. Generally the thread reinforcement should have reasonable tensile strength—say a breaking strength of at least 5 pounds— and it should be reasonably resistant to stretching. The extrusion operation is conducted under substantial pressure and almost immediately after foam material leaves the extruder, it expands to approximately its final dimension. During the expansion operation, the material is very weak mechanically, and it is probably this weakness which makes desirable the use of thread reinforcement or equivalent means, as pointed out above.

Following the extrusion and expansion of the core material, the core is passed through a cooling medium such as water to effect setting of the extruded material. After the core has been cooled and set, it is then passed through a second extrusion mechanism, together with the conductor or conductors which are to be provided in the finished cable. During the second extrusion operation, the sheath is formed about the core, and in the manufacture of duplex cable of the type shown in Figures 2 and 3, this sheath includes integral portions of increased thickness which provide secondary sheaths for enclosing each of the conductors.

When the core is made of foam polyethylene material, the sheath desirably is made of normal polyethylene, as previously stated. In the manufacture of cables for television lead-in and similar uses, the use of foam polyethylene expanded to a density of from about .40 to .50 gram per cubic centimeter has particular advantages. Normal polyethylene has a density of from about .85 to 1.00 gram per cubic centimeter.

The above-described process is illustrated diagrammatically in Figure 1, where the two extrusion mechanisms are illustrated at 21 and 23. The core reinforcement 25 is shown in the Figure 1 apparatus as coming from a suitable supply reel 27 and being guided into the extruder through a guide sheave 29.

Figure 6:
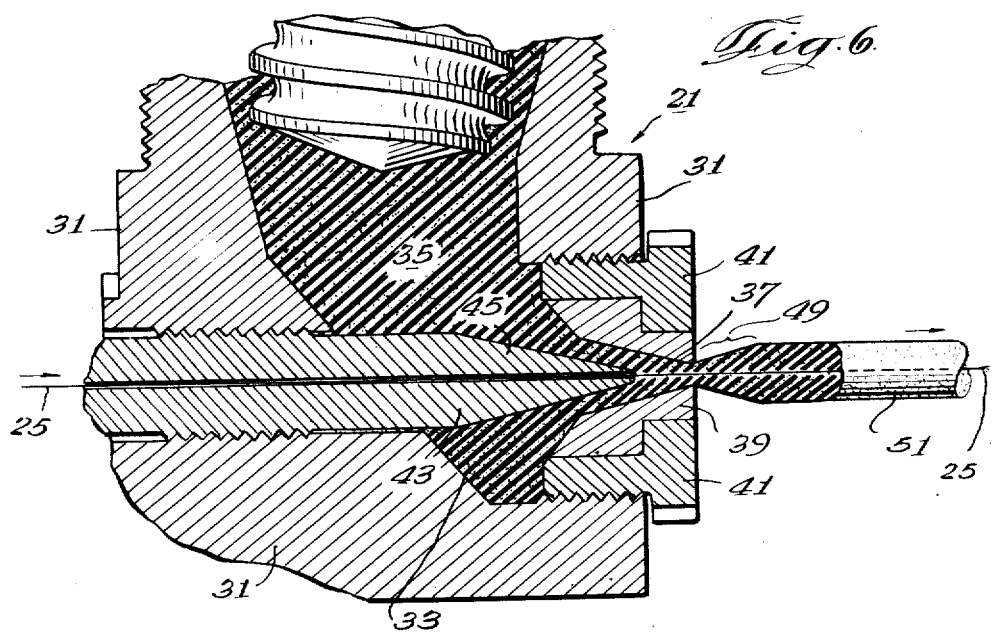
Figures 6 and 7 are sectional views illustrating extrusion apparatus suitable for use in the manufacture of cable in accordance with the process illustrated diagrammatically in Figure 1.

The general details of a suitable extruder for making the core are shown in Figure 6. The particular apparatus there illustrated includes a main casing or housing 31, which serves as the support for the other elements of the structure, and which is provided with a central chamber 33 for containing the insulating material, indicated at 35, from which the core is to be formed.

The cross-sectional outline of the core extrusion is determined by the shape of the die opening 37 in a die piece 39, which is supported by a suitably threaded support element 41 adapted to be screwed into the outer casing 31, as shown. The thread reinforcement 25 for the core is guided through the extrusion mechanism by a guide member 43 having a tip 45, which is supported so as to extend into the die opening 37, as illustrated. The die opening 37 and the guide tip 45 in the illustrated embodiment are generally conical in form.

The extrusion mechanism 21 also includes a screw or other feed means 47 for forcing the insulating compound 35 about the thread reinforcement 25, and for forming the core extrusion during the operation of the equipment. Normally, the thread reinforcement 25 will be moved longitudinally through the die opening 37 at a velocity equal to the velocity at which the core is formed. As shown at 49, the insulating material being extruded expands immediately upon leaving the die opening 37. When foam polyethylene is being used in the manufacture of cores for duplex conductors for television lead-in service, the expansion is adjusted to produce a core 51 having a cross-sectional area approximately double the cross-sectional area at the outlet and of the die opening 37.

During the expansion operation, the core is supported by the reinforcement 25. Some cooling occurs, both as a result of the expansion and as a result of the exposure of the core to the air or other surrounding medium. Immediately following the expansion and this initial or pre-cooling, the core 51 is conducted into a finish cooling and setting means, indicated at 53, which means may comprise an elongated pan or trough containing water or other coolant.

Figure 7:
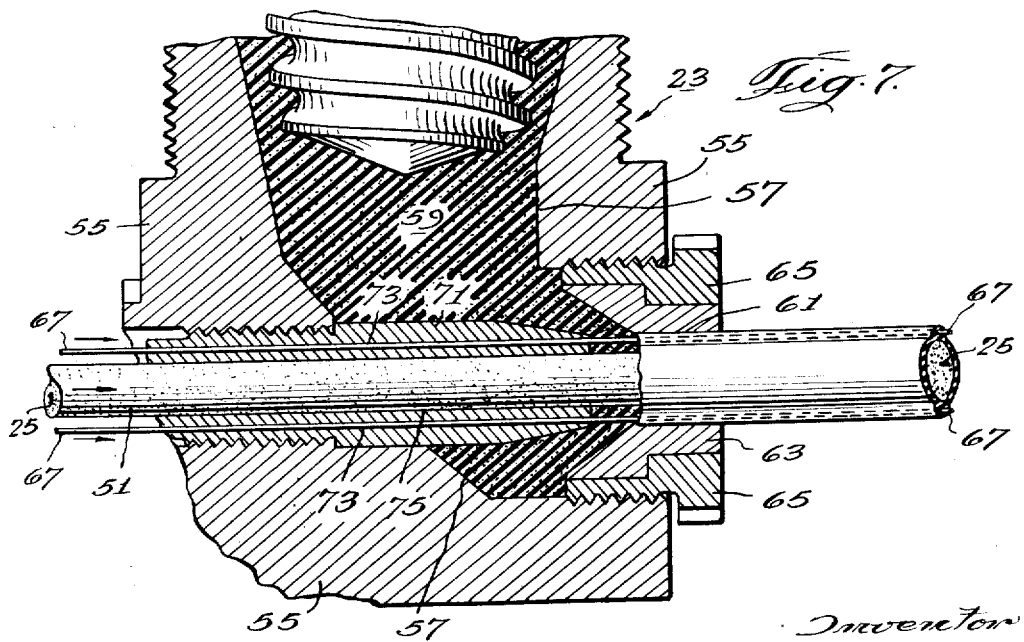

Next, the core 51, which is now self-supporting and quite strong mechanically, is conducted into and through the second extruder mechanism 23. During this operation, the core is combined with the conductors and the external sheath to form the finished cable. The extrusion apparatus illustrated in Figure 7 is illustrative of mechanisms suitable for this step in the operation. Similar to the extrusion apparatus illustrated in Figure 6, the mechanism includes a main casing 55, having a central chamber 57 for containing the insulating material, indicated at 59, which is to be applied to the core and the cable conductors.

The cross-sectional outline of the cable is determined by the shape of the die opening 61 in a die piece 63 which, similar to the die piece 39, is supported by a suitable threaded element 65 adapted to fit into the main casing 55, as shown. The core 51 and the two conductors 67, each of which is delivered from a suitable supply reel 69 (see Figure 1), are guided into and through the extrusion mechanism by means of a guide member 71 which is supported in the main casing 55 so as to extend into proximity to the die opening 61. The guide member 71 includes suitably spaced, longitudinal inner bores 73 for receiving and guiding the conductor wires 67 and a central bore 75 for receiving and guiding the core 51.

Following the extrusion operation performed in the second extruder 23, the cable is conducted into and through a suitable mechanism 77 for cooling and setting the sheath insulation. This may comprise a trough containing water or other cooling medium, similar to the cooling apparatus 53 used in conjunction with the first extrusion means. The extruded cable may be precooled by passage through the air or other medium prior to its delivery to the cooler 77, if that is desired or is convenient. The finished cable, which is shown at 79 in Figure 1, is then dried and reeled. The particular cable manufactured by the apparatus illustrated in Figures 1, 6 and 7 is similar to the cable illustrated in enlarged views of Figures 2 and 3. It will be understood, however, that the procedure described can be used in the manufacture of other types of cable, although applicant is not aware of any other commercially practical procedure for manufacturing the television lead-in cable illustrated in Figures 2 and 3.

It is relatively easy in a cable construction of the type illustrated in Figures 2 and 3 to effect separation of the individual conductors and the insulation surrounding those conductors from the remaining portions of the cable. That is to say, this cable is a divisible type cable. As illustrated in Figure 4, each of the conductors 17 and the thickened section 15 of the sheath which provides insulation surrounding that conductor can be grasped by a pair of pliers and pulled away from the core 11 and the remaining portions of the cable. The sheath insulation, especially when the sheath is made of polyethylene resin material, tends to part in the region adjacent the conductors 17, where the thickened sections 15 of the sheath 13 merge into the remaining portions of the sheath, as illustrated, and the cable can be torn apart quite readily. The core 11 and the remaining portions of the sheath insulation may then be cut off, as illustrated in Figure 5, and the ends of the wires 17 bared, whereupon the cable is ready for use.

As previously pointed out, one of the more serious deficiencies of the prior art, hollow sheath construction cables has resulted from the fact that unless such a cable is sealed, moisture and dirt will tend to collect on the interior surface of the sheath during the life of the cable. This is especially true in home installations, where the inner end of the hollow cable may be open to warm, humidified air, while the other end is open to the outdoors. Under such conditions, air will flow through a hollow cable in a fairly steady stream and during cool weather, moisture contained in such air will condense on the interior of the cable sheath. Rain and smoke are also troublesome. These difficulties are effectively avoided in the cable constructions in accordance with the invention by virtue of the fact that the individual cells of the multi-cellular or foam core do not connect with each other, and serve to effectively seal the interior of the cable against moisture or dirt.

Various types of insulating materials can be used in the manufacture of cables in accordance with the invention. For high frequency use, it is, of course, important that the insulating material shall have suitable di-electric and low-loss characteristics. An outer sheath compounded from normal polyethylene resins and a core of foam or multi-cellular polyethylene in the density ranges above-stated, are particularly satisfactory for both V. H. F. and U. H. F. transmission lines, such as are used in television lead-in service. It will be understood, however, that other insulating materials can be used. Certain rubber compounds, for example, are satisfactory, especially in instances where the power to be transmitted is at frequencies in the V. H. F. band or lower. In order to realize the full advantages of the invention, it is important that at least a very substantial proportion of the individual cells formed in the foam or multi-cellular material shall not communicate with each other. Also, the core should bond sufficiently well to the sheath to prevent longitudinal flow of gas or vapor through the cable. Materials which are bondable to each other will hereinafter be referred to as compatible materials.

The wire conductors used in cable constructions in accordance with the invention are desirably of small diameter in order to minimize the cable capacitance, and for convenience in installation, it is generally desirable that the cable conductor shall be of flexible, stranded construction. For television lead-in purposes, conductors consisting of 7 strands of No. 28 A. W. G. wire, cabled together to provide a conductor having an over-all diameter of approximately .039 inch, will be found very satisfactory. For V. H. F. and U. H. F. installations, it is undesirable to use a conductor having a diameter greater than about 0.47 inch.

The relative dimensions of the cable are also of importance, especially for V. H. F. and U. H. F. service. When transmitting power in this range, the cross-sectional outline of the cable is desirably such that the conductors are separated at least .25 to .35 inch. Generally, the core should occupy at least 60% of the total cross-sectional area of the cable, and the circular cross-sectional core has been found to have particular advantage. An especially satisfactory duplex cable for 300 ohm television line service was made with a circular core of foam polyethylene about .250 inch in diameter, at a specific density of .42 gram per cubic centimeter, and a sheath about .032 inch thick, except in the region adjacent the conductors where the sheath thickness was approximately .094 inch. The conductors each comprised 7 strands of No. 28 A. W. G. wire and were spaced apart about .312 inch.

The composite cable structure of the invention has been found to be particularly satisfactory for its intended purposes. In the preferred cable structures in accordance with the invention, the core portion of the cable comprises a multi-cellular, hermetically sealed element which is closed against the axial flow of gas or vapor, and which is bonded to the outer sheath insulation, thereby rendering the cable interior dirt-proof and moisture-proof. The electrical characteristics of the cable are thereby maintained at maximum efficiency throughout its operative life.

At the same time, the core is quite flexible and this permits the cable to be bent along curves of relatively short radius. This and the other mechanical properties of the core makes possible the use of a sheath of such dimensions that the cable can be readily twisted to effect transposition of the conductors much more satisfactorily than the arrangements which include a hollow, tubular sheath arrangement. Additionally, the multi-cellular core construction described makes possible a cable which can be clamped tightly and rigidly affixed to the associated apparatus during installation without danger of crushing or distortion. It is also almost impossible to kink this cable.

Cables in accordance with the invention are very light in weight and can be manufactured in continuous lengths on high speed extrusion equipment by the use of a minimum amount of insulating material and at minimum cost. In fact, the amount of insulation required in the multi-cellular core construction above described is frequently less, and in any event very little greater, than the amount required in the hollow, tubular arrangement. A further, important characteristic of the cable is its inherent ease of divisibility during use, this characteristic greatly facilitating its ease of installation.

Various of the features of the invention believed to be new are set forth in the appended claims.

I claim:

1. A duplex electrical cable for the transmission of high frequency electrical energy, comprising a continuous core which is approximately circular in cross section and which is made of multi-cellular insulating material, a continuous tubular jacket of solid insulating material impervious to fluid and compatible with the material forming said core applied to and in intimate contact with said core, the core having a dielectric constant less than that of the jacket, and a pair of spaced conductor wires located within said jacket at opposite sides of said core, at least a substantial proportion of the individual cells in said core being sealed from each other and said core being bonded directly to said jacket to prevent the longitudinal flow of gas or vapor through the interior of said jacket.

2. A duplex electrical cable for the transmission of high frequency electrical energy comprising a continuous core, which is approximately circular in cross section and which is made of multi-cellular insulating material, a continuous tubular jacket of solid insulating material impervious to fluid and compatible with the material forming said core applied to said core and in close contact therewith, the core having a dielectric constant less than that of the jacket, and a pair of spaced conductor wires located at opposite sides of said core, said wires being each embedded in a thickened portion of said jacket, at least a substantial proportion of the individual cells in said core being sealed from each other and said core being bonded directly to said jacket to prevent the longitudinal flow of gas or vapor through the interior of said jacket.

3. A duplex electrical cable for the transmission of high frequency electrical energy, comprising a continuous core, which is approximately circular in cross section and which is made of foam polyethylene insulating material having a specific density within the range of from about .40 to .50 gram per cubic centimeter, a thin-walled jacket of normal polyethylene insulating material having a specific density within the range of from about .85 to 1.00 gram per cubic centimeter applied to said core, and a pair of spaced conductor wires located in opposite sides of said jacket, each of said conductor wires being embedded in a thickened portion of said jacket, at least a substantial proportion of the individual cells in said core being unconnected and said core being bonded directly to said jacket to prevent the longitudinal flow of gas and vapor through the interior of said jacket.

References Cited in the file of this patent

UNITED STATES PATENTS

| Number | Name | Date |
|---|---|---|
| 268,060 | Waring | Nov. 28, 1882 |
| 1,305,247 | Beaver et al. | June 3, 1919 |
| 2,158,496 | George | May 16, 1939 |
| 2,185,738 | Rockoff | Jan. 2, 1940 |
| 2,216,010 | Hobart | Sept. 24, 1940 |
| 2,543,696 | Krueger | Feb. 27, 1951 |
| 2,556,224 | Scott | June 12, 1951 |
| 2,571,259 | Kusiak | Oct. 16, 1951 |

OTHER REFERENCES

Scientific American, September 1947, pages 119–121.

UNITED STATES PATENT OFFICE
CERTIFICATE OF CORRECTION

Patent No. 2,814,666

November 26, 1957

Richard D. Maddox

It is hereby certified that error appears in the printed specification of the above numbered patent requiring correction and that the said Letters Patent should read as corrected below.

Column 6, line 14, for "0.47 inch" read -- .047 inch --.

Signed and sealed this 11th day of February 1958.

(SEAL)
Attest:
KARL H. AXLINE
Attesting Officer

ROBERT C. WATSON
Commissioner of Patents